G. P. YOUMANS.
ROTARY CUTTER.
APPLICATION FILED FEB. 14, 1908.

902,636.

Patented Nov. 3, 1908.
2 SHEETS—SHEET 1.

Witnesses
Lulu Gunnfield
Phina Woodruff

Inventor
George P. Youmans
By Chappell & Earl
Attorneys

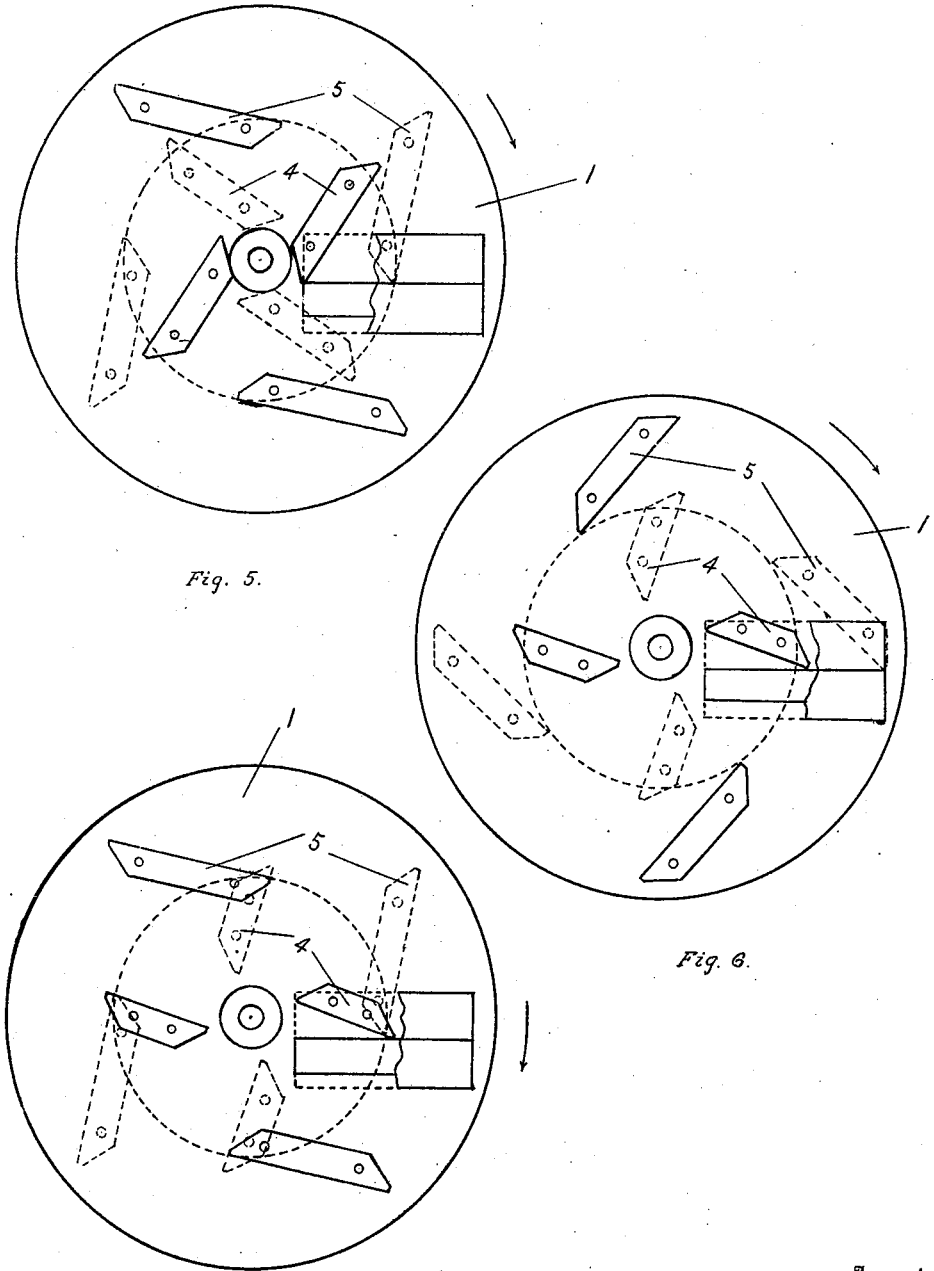

UNITED STATES PATENT OFFICE.

GEORGE P. YOUMANS, OF GALESBURG, MICHIGAN, ASSIGNOR TO KALAMAZOO TANK & SILO COMPANY, OF KALAMAZOO, MICHIGAN.

ROTARY CUTTER.

No. 902,636.

Specification of Letters Patent.

Patented Nov. 3, 1908.

Application filed February 14, 1908. Serial No. 415,985.

*To all whom it may concern:*

Be it known that I, GEORGE P. YOUMANS, a citizen of the United States, residing at the village of Galesburg, county of Kalamazoo, State of Michigan, have invented certain new and useful Improvements in Rotary Cutters, of which the following is a specification.

This invention relates to improvements in rotary cutters. My improved rotary cutter is especially designed by me for use in cutting coarse material, such as ensilage, corn and the like, although it is applicable for a great variety of uses.

The main objects of this invention are, First, to provide an improved rotary cutter which has an even, steady motion when in operation. Second, to provide an improved rotary cutter which may be operated with a minimum amount of power. Third, to provide an improved rotary cutter in which the knives are so arranged and formed as to be economical to produce and easily sharpened, and one which in operation is very effective.

Further objects, and objects relating to structural details, will definitely appear from the detailed description to follow.

I accomplish the objects of my invention by the devices and means described in the following specification.

The invention is clearly defined and pointed out in the claims.

Figure 1:
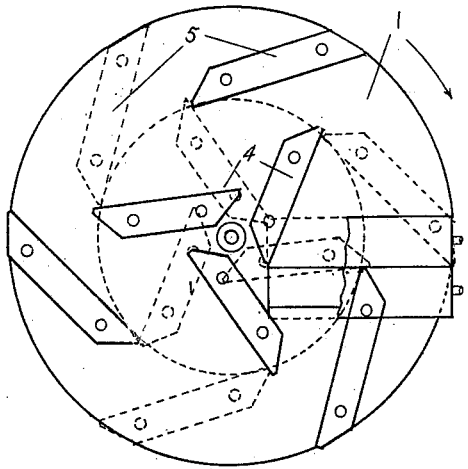
Figure 2:
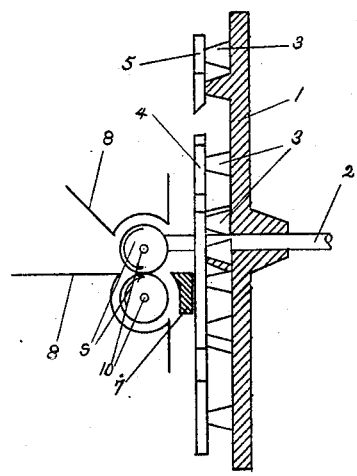
Figure 3:
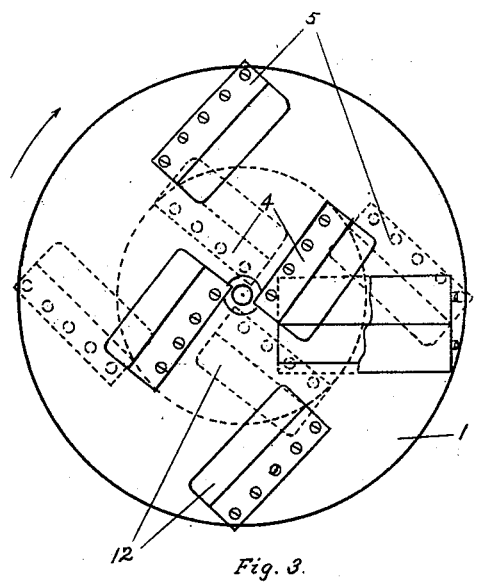
Figure 4:
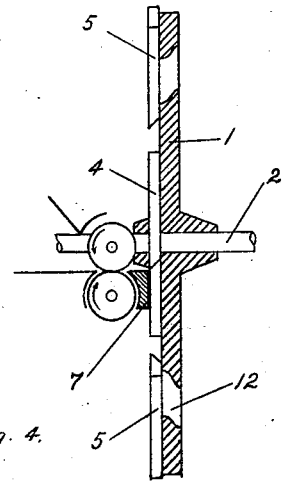

A structure embodying the features of my invention is clearly illustrated in the accompanying drawing, forming a part of this specification, in which, Figure 1 is a rear elevation of the cutter head of my improved cutter, the feed rolls being shown diagrammatically with parts being broken away. Fig. 2 is a vertical central section through the cutter head and the cutter bar, the feed rolls being shown diagrammatically in connection therewith. Fig. 3 is a rear view of a modified form of my improved cutter head in which the blades are secured directly upon the disk-like cutter head, the head being provided with clearance openings 12 therethrough, the arrangement of the knives being also somewhat modified. Fig. 4 is a vertical section through the modified form of the cutter head shown in Fig. 4, the feed rolls being shown diagrammatically. Fig. 5 is a rear elevation of another modification of the cutter head showing the knives arranged so that they all shear outwardly on the cutter bar. Fig. 6 is a similar view of a further modification, showing the knives arranged so that they shear inwardly on the cutter bar. Fig. 7 is a similar view of a still further modification, showing the knives arranged so that they shear inwardly and outwardly from the center of the cutter bar.

In the drawing, similar numerals of reference refer to similar parts throughout the several views.

Referring to the drawing, 1 is a disk-like cutter head, mounted upon the shaft 2. On the rear face of the cutter head, are rearwardly-projecting studs 3, on the rear ends of which are mounted the knives 4 and 5, which are arranged alternately in series, as appears clearly from Fig. 1. By mounting the knives on the studs, clearance is provided for the cut material. The cutter bar 7 is arranged to coact with the knives. The feed rolls 9 are arranged in a suitable hopper, as 8, to deliver the material to the cutter bar, as is diagrammatically shown in the drawing, the rolls being mounted on suitable shafts, as 10, the driving connections therefor not being illustrated, as they form no part of this invention. The knives are, as stated, arranged on the cutter head in series so that they alternate.

In the preferred construction, the knives of the inner series are arranged so that they shear outwardly on the cutter bar, and those of the outer series are arranged to shear inwardly thereon, as clearly appears from the dotted lines in Figs. 1 and 3. The knives in the preferred construction are arranged so that they are constantly in action, that is, before one knife has entirely passed from cutting relation with the cutter bar the succeeding knife reaches that position. By this arrangement, the cutter may be operated with less power than would otherwise be required, and the material to be cut is sheared toward the center. This alternate arrangement of the knives also effectively obviates to a large degree the "chopping" action usually present in cutters of this class.

In the modified construction shown in Figs. 3 and 4, the studs 3 are omitted from the cutter head and the knives are mounted directly upon the rear face of the cutter head. In this construction, the cutter head is provided with clearance openings 12.

In the modified construction shown in Fig.

5, the knives are all arranged to shear outwardly on the cutter bar. In Fig. 6 they are all arranged so that they shear inwardly thereon. In Fig. 7 they are arranged so that the inner series of knives shear inwardly and the outer series shear outwardly. The structure, however, having the knives arranged so that the knives of the inner series shear outwardly and the knives of the outer series shear inwardly, is preferred by me.

I have, in the accompanying drawing, shown my invention in a diagrammatic manner, as it is believed that its application will be readily understood by those skilled in the art to which this invention relates.

Having thus described my invention, what I claim as new and desire to secure by Letters Patent is:

1. In a rotary cutter, the combination with the cutter bar, of a revolubly mounted cutter head; a plurality of knives for said cutter head, said knives having straight cutting edges and being arranged in an equally spaced relation and alternately in an inner and outer series, the knives of the inner series being arranged at an angle relative to the cutter bar to shear outwardly thereon and the knives of the outer series being arranged at an angle relative to the cutter bar to shear inwardly thereon, said knives being so arranged that a knife of each series coacts with the cutter bar in making a complete cut thereon.

2. In a rotary cutter, the combination with the cutter bar, of a revolubly mounted cutter head; a plurality of knives for said cutter head, said knives having straight cutting edges and being arranged in an equally spaced relation and alternately in an inner and outer series, the knives being arranged at an angle relative to the cutter bar, those of one series being arranged to shear oppositely to those of the others, said knives being so arranged that a knife of each series coacts with the cutter bar in making a complete cut thereon.

In witness whereof, I have hereunto set my hand and seal in the presence of two witnesses.

GEORGE P. YOUMANS.

Witnesses:
LULU GREENFIELD,
A. F. ADAMS.